(12) United States Patent
He et al.

(10) Patent No.: US 11,704,764 B2
(45) Date of Patent: Jul. 18, 2023

(54) METHOD AND SYSTEM FOR GENERATING WATERMARK ON THE BASIS OF GRAPHIC, TERMINAL, AND MEDIUM

(71) Applicant: SHENZHEN LEAGSOFT TECHNOLOGY CO., LTD., Shenzhen (CN)

(72) Inventors: Huarong He, Shenzhen (CN); Shuangjun Zhang, Shenzhen (CN); Zhi Wang, Shenzhen (CN)

(73) Assignee: SHENZHEN LEAGSOFT TECHNOLOGY CO, LTD., Shenzhen (CN)

( * ) Notice: Subject to any disclaimer, the term of this patent is extended or adjusted under 35 U.S.C. 154(b) by 577 days.

(21) Appl. No.: 16/970,348

(22) PCT Filed: Mar. 29, 2019

(86) PCT No.: PCT/CN2019/080495
§ 371 (c)(1),
(2) Date: Aug. 15, 2020

(87) PCT Pub. No.: WO2019/201079
PCT Pub. Date: Oct. 24, 2019

(65) Prior Publication Data
US 2021/0090203 A1 Mar. 25, 2021

(30) Foreign Application Priority Data
Apr. 16, 2018 (CN) .......................... 201810337429.8

(51) Int. Cl.
*H04L 9/40* (2022.01)
*G06T 1/00* (2006.01)
*G11B 20/00* (2006.01)

(52) U.S. Cl.
CPC ........ *G06T 1/0021* (2013.01); *G11B 20/0021* (2013.01); *H04L 63/0428* (2013.01)

(58) Field of Classification Search
CPC ... G06T 1/0021; H04L 63/12; H04L 63/0428; G11B 20/0021
(Continued)

(56) References Cited

U.S. PATENT DOCUMENTS 7,281,272 B1 * 10/2007 Rubin ..................... H04L 67/02
713/153
7,581,105 B2 * 8/2009 Dietl ....................... G06F 21/64
713/176
(Continued)

FOREIGN PATENT DOCUMENTS

CN 1992794 A 7/2007
CN 108648132 A 10/2018

*Primary Examiner* — Amare F Tabor

(57) ABSTRACT

The invention provides a method and system for generating a watermark on the basis of graphic, a terminal, and a medium. The method includes acquiring a watermark image and at least one watermark unit image; acquiring watermark encryption information; determining the distribution information of the watermark unit images in the watermark image according to the watermark encryption information and a preset encryption model, the distribution information comprising imaging regions of the watermark unit images in the watermark image; and overlaying each watermark unit image into a corresponding imaging region in the watermark image to generate the watermark. The watermark encryption information has a one-to-one corresponding relationship with the distribution information of the watermark unit images in the watermark image, and the corresponding relationship can be defined by a user so that others cannot crack the watermark without knowing the encryption model, thereby improving the watermark cracking difficulty. Moreover, the method can generate the watermark according to (Continued)

the watermark image and the watermark unit images input by the user, and provide personalized customization of the watermark under the function of encryption to improve the user experience.

10 Claims, 3 Drawing Sheets

(58) Field of Classification Search
USPC .......................................................... 726/26
See application file for complete search history.

(56) References Cited

U.S. PATENT DOCUMENTS

| | | | | |
|---|---|---|---|---|
| 8,078,878 | B2 * | 12/2011 | Dietl | H04L 9/3231 |
| | | | | 713/176 |
| 8,169,634 | B2 * | 5/2012 | Tabata | H04N 1/32203 |
| | | | | 358/1.14 |
| 8,189,859 | B2 * | 5/2012 | Kim | H04N 21/8358 |
| | | | | 713/176 |
| 9,727,753 | B2 * | 8/2017 | Taylor | G06F 21/16 |
| 10,045,040 | B2 * | 8/2018 | Wachtfogel | H04N 19/467 |
| 10,834,457 | B1 * | 11/2020 | Bourgoyne | H04N 21/4318 |
| 2005/0206158 | A1 * | 9/2005 | Noyama | G09C 5/00 |
| | | | | 283/74 |
| 2007/0053325 | A1 * | 3/2007 | Shin | H04K 1/00 |
| | | | | 370/335 |
| 2015/0205755 | A1 * | 7/2015 | Gilbert | G06F 15/167 |
| | | | | 709/212 |

* cited by examiner

1

METHOD AND SYSTEM FOR GENERATING WATERMARK ON THE BASIS OF GRAPHIC, TERMINAL, AND MEDIUM

RELATED APPLICATIONS

This is a national phase application of the International Application PCT/CN2019/080495 filed Mar. 29, 2019, which claims the benefit of the Chinese Patent Application CN201810337429.8 filed Apr. 16, 2018, each of which is incorporated herein by reference in its entirety.

FIELD OF THE INVENTION

The present invention belongs to the technical field of information processing. More particularly, this invention relates to a method and system for generating a watermark on the basis of graphic, a terminal, and a medium.

BACKGROUND OF THE INVENTION

A watermark refers to some digital information encoded into data multimedia (such as image, sound and video signal) to achieve the functions of file authenticity identification, copyright protection, etc. The embedded watermark information is hidden in a host file, without affecting the viewability and integrity of the original file.

The watermark should be able to provide complete and reliable evidence for the ownership of a copyrighted information product. A watermark algorithm can recognize relevant information (such as registered user number, product logo and meaningful text) of an owner embedded in a protected object, and extract it as required. As far as many algorithms have emerged, an attacker can completely destroy the watermark in an image, or copy a theoretically existing original image, which leads to the failure of a file owner in convincingly providing valid evidence for copyright ownership.

OBJECTS AND SUMMARY OF THE INVENTION

Aiming at the defects in prior arts, the present invention provides a method and system for generating a watermark on the basis of graphic, a terminal, and a medium, capable of improving the watermark cracking difficulty.

In a first aspect, a method for generating a watermark on the basis of graphic includes receiving a first input instruction from a user to acquire a watermark image and at least one watermark unit image; receiving a second input instruction from the user to acquire watermark encryption information; determining the distribution information of the watermark unit images in the watermark image according to the watermark encryption information and a preset encryption model, the distribution information comprising imaging regions of the watermark unit images in the watermark image; and overlaying each watermark unit image into a corresponding imaging region in the watermark image according to the imaging region of each watermark unit image to generate the watermark.

Further, the watermark unit image comprises one or more of logo, vector diagram, graphics, text, and numbers input by a user; and the watermark image comprises graphics, text or numbers.

Further, the watermark encryption information comprises one or more of user IP address, equipment name and user account.

Further, the distribution information also comprises imaging colors of the watermark unit images; and the method further includes separately determining the colors of the corresponding watermark unit images in the watermark image according to the imaging color of each watermark unit image to generate the watermark, after overlaying each watermark unit image into a corresponding imaging region in the watermark image.

Further, the step of overlaying each watermark unit image into a corresponding imaging region in the watermark image according to the imaging region of each watermark unit image specifically includes identifying the contour of each watermark unit image; and overlaying the contour of the watermark unit image into the corresponding imaging region in the watermark image.

In a second aspect, a terminal comprises a processor, input equipment, output equipment and a memory all connected with each other. The memory is used for storing computer programs, which comprise program instructions. The processor is configured for calling the program instructions to execute the method in the first aspect.

In a third aspect, a computer readable storage medium stores computer programs, which comprise program instructions. When the program instructions are run on the processor, the processor is enabled to execute the method in the first aspect.

In a fourth aspect, a system for generating a watermark on the basis of graphic comprises an input unit for receiving a first input instruction from a user to acquire a watermark image and at least one watermark unit image, and also receiving a second input instruction from the user to acquire watermark encryption information; an encryption unit for determining the distribution information of the watermark unit images in the watermark image according to the watermark encryption information and a preset encryption model, the distribution information comprising imaging regions of the watermark unit images in the watermark image; and a generation unit for overlaying each watermark unit image into a corresponding imaging region in the watermark image according to the imaging region of each watermark unit image to generate the watermark.

Further, the watermark unit image comprises one or more of logo, vector diagram, graphics, text, and numbers input by a user; and the watermark image comprises graphics, text or numbers.

Further, the distribution information also comprises imaging colors of the watermark unit images; and the generation unit is also used for separately determining the colors of the corresponding watermark unit images in the watermark image according to the imaging color of each watermark unit image to generate the watermark.

As shown above, in the method and system for generating a watermark on the basis of graphic, the terminal and the medium provided in the present invention, the watermark encryption information has a one-to-one corresponding relationship with the distribution information of the watermark unit images in the watermark image, and the corresponding relationship, i.e. the encryption model, can be defined by a user so that others cannot crack the watermark without knowing the encryption model, thereby improving the watermark cracking difficulty. Moreover, the method can generate the watermark according to the watermark image and the watermark unit images input by the user, and provide personalized customization of the watermark under the function of encryption to improve the user experience.

BRIEF DESCRIPTION OF FIGURES

Hereinafter, a brief introduction is given to the figures required in embodiments of the present invention or the description in prior arts in order to clearly illustrate the embodiments or technical solutions in prior arts. In all the figures, similar elements or parts are generally identified by similar reference signs. In the figures, each element or part is not necessarily drawn to the actual scale.

DETAILED DESCRIPTION OF THE EMBODIMENTS

Figure 1:
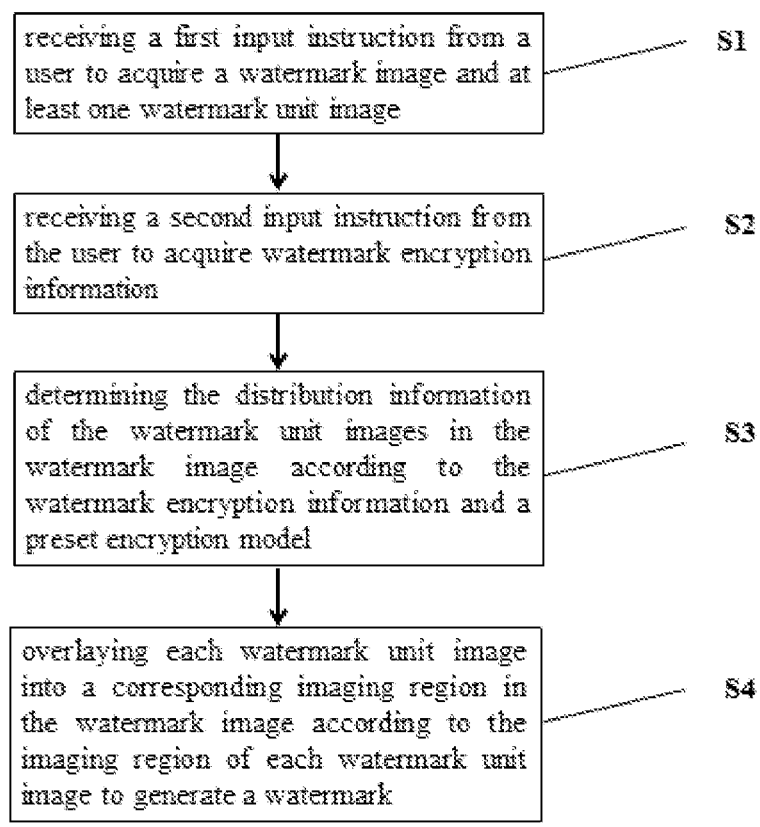
FIG. 1 is a flow chart of the method provided in the first example.
Figure 2:
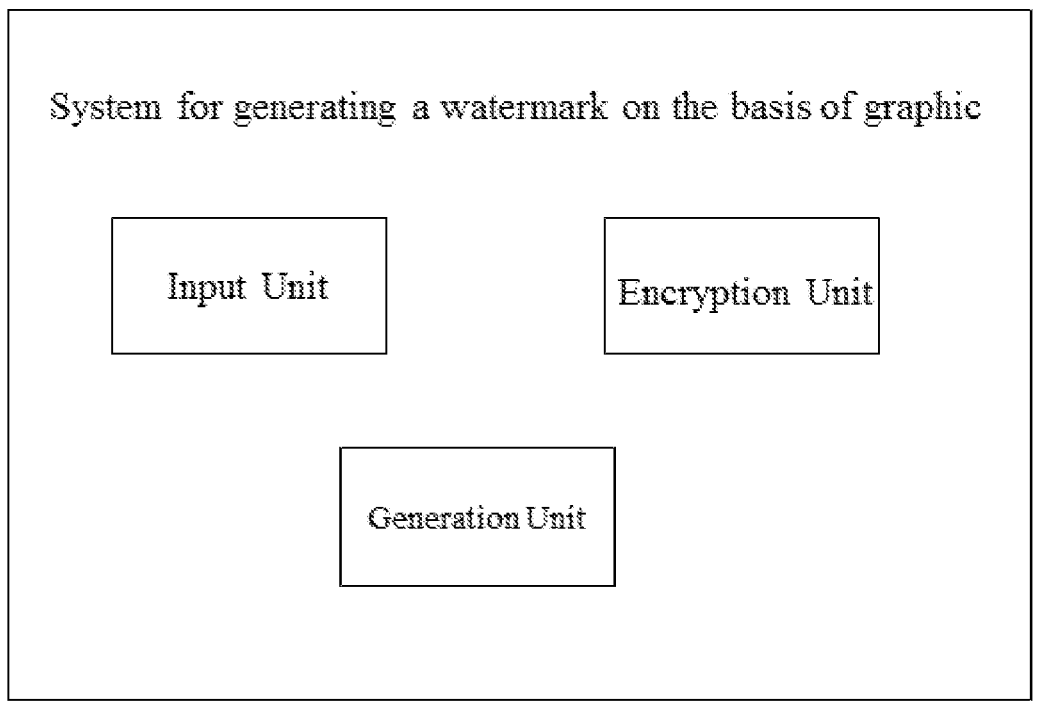
FIG. 2 is a block diagram of the system provided in the fourth example.

Hereinafter, the embodiments of the technical solutions of the present invention will be described in detail in conjunction with the accompanying drawings. The following embodiments are only used to clearly illustrate the technical solutions of the present invention, and therefore are only used as examples, and cannot be used to limit the protection scope of the present invention. It should be noted that, unless otherwise stated, the technical or scientific terms used in this application should receive the general meanings understood by those skilled in the art to which the present invention belongs.

It should be understood that the terms "include" and "comprise", when used in this specification, indicate the existence of the described features, wholes, steps, operations, elements and/or components, but do not exclude the existence or addition of one or more other features, wholes, steps, operations, elements, components or combinations thereof.

It should also be understood that the terms in the specification of the present invention are used only for the purpose of describing specific examples and are not intended to limit the present invention. As used in the specification of the present invention, unless otherwise indicated clearly in the context, the singular forms "a", "an" and "the" are intended to include plural forms.

As used in the specification, the term "if" can be interpreted as "when" or "once" or "in response to determination of" or "in response to detection of" depending on the context. Likewise, the phrase "if determining" or "if detecting (the described condition or event) can be interpreted as "once determining" or "in response to determination of" or "once detecting (the described condition or event)" or "in response to detection of (the described condition or event)" depending on the context.

In specific implementation, the terminal described in the examples of the present invention comprises, but is not limited to, other portable equipment such as mobile phones, laptop computers, and tablet computers having touch sensitive surfaces (e.g. touch screen displays and/or touch pads). It should also be understood that, in some examples, the equipment is not portable communication equipment but a desktop computer having a touch sensitive surface (e.g. touch screen display and/or touch pad).

In the following discussion, a terminal comprising a display and a touch sensitive surface is described. However, it should be understood that the terminal may comprise one or more pieces of other physical user interface equipment such as physical keyboard, mouse and/or control lever.

The terminal supports various applications such as one or more of the following: drawing application, demonstration application, text processing application, website creation application, disk burning application, spreadsheet application, telephone application, video conferencing application, email application, instant message receiving/sending application, exercise support application, photo management application, digital camera application, digital video camera application, web browsing application, digital music player application and/or digital video player application.

The various applications that can be run on the terminal may use at least one piece of common physical user interface equipment such as touch sensitive surface. One or more functions of the touch sensitive surface and corresponding information displayed on the terminal can be adjusted and/or changed between the applications and/or within the corresponding applications. As a result, the common physical architecture (such as touch sensitive surface) of the terminal can support various applications having user interfaces visual and transparent to the user.

Example 1

With reference to FIG. 1, a method for generating a watermark on the basis of graphic includes:
S1: receiving a first input instruction from a user to acquire a watermark image and at least one watermark unit image;
Specifically, the watermark image and the watermark unit images can be images directly provided by the user, manually drawn by the user, directly input by the user, etc.
S2: receiving a second input instruction from the user to acquire watermark encryption information; Specifically, the watermark encryption information is input by the user.
S3: determining the distribution information of the watermark unit images in the watermark image according to the watermark encryption information and a preset encryption model, the distribution information comprising imaging regions of the watermark unit images in the watermark image;
Specifically, the encryption model can be set by the user. The user can also define the encryption model by standard encryption rules. For example, the user can distinguish different watermark encryption information by distinguishing the spacing between the adjacent watermark unit images or the color of each watermark unit image.
S4: overlaying each watermark unit image into a corresponding imaging region in the watermark image according to the imaging region of each watermark unit image to generate the watermark.
Specifically, in the generated watermark, the watermark unit images are similar to the pixels of the watermark image, that is, the shape of the final watermark is the same as that of the watermark image, and each pixel of the watermark image is the watermark unit image. The multiple watermark unit images are arranged according to the imaging regions to form the watermark image as a whole.

The watermark obtained by the method ensures that outsiders cannot acquire the watermark encryption information to crack the watermark if having no knowledge of the encryption model, thereby improving the file copyrighting security.

In the method of the example, the watermark encryption information has a one-to-one corresponding relationship with the distribution information of the watermark unit images in the watermark image, and the corresponding relationship, i.e. the encryption model, can be defined by the user so that others cannot crack the watermark without knowing the encryption model, thereby improving the watermark cracking difficulty. In addition, the method can generate the watermark according to the user input watermark image and watermark unit images, and provide personalized customization of the watermark under the function of encryption to improve the user experience.

Example 2

On the basis of other examples, the following details are added to this example.

This example has no limitation to types of the watermark unit images. In specific implementation, the watermark unit images comprise one or more of logo, vector diagram, graphics, text, and numbers input by a user; and the watermark image comprises graphics, text or numbers.

This example has no limitation to the type of the watermark image. In specific implementation, the watermark image comprises graphics, text or numbers.

Specifically, the user can generate the watermark according to his/her own logo. For example, the user provides his/her own logo as watermark unit image and defines the watermark image as triangle, so that the generated watermark is a triangle composed of logos provided by multiple users.

The watermark unit image can be an individual pattern or a combined pattern formed by piecing together multiple patterns, such as a combined pattern of triangle, dot, rectangle, etc.

This example has no limitation to the watermark encryption information. In specific implementation, the watermark encryption information comprises one or more of user IP address, equipment name and user account.

Specifically, the watermark encryption information is input by the user.

Example 3

On the basis of other examples, the following details are added to this example.

The distribution information further comprises imaging colors of the watermark unit images.

The method further includes separately determining the colors of the corresponding watermark unit images in the watermark image according to the imaging color of each watermark unit image to generate the watermark, after overlaying each watermark unit image into a corresponding imaging region in the watermark image.

Specifically, the imaging color of the watermark unit image has a one-to-one corresponding relationship with the watermark encryption information, and different watermark encryption information has different watermark image colors which are determined by the watermark unit images. In the watermark generated by the method, the watermark encryption information is closely related to the distribution (including the spacing between the adjacent watermark unit images, etc.) and colors of the watermark unit images in the watermark image. The colors can be represented by RGB values, gray values, etc.

Further, the step of overlaying each watermark unit image into a corresponding imaging region in the watermark image according to the imaging region of each watermark unit image specifically includes identifying the contour of each watermark unit image; and overlaying the contour of the watermark unit image into the corresponding imaging region in the watermark image.

Specifically, the step of overlaying the watermark unit images to the watermark image is implemented by mainly overlaying the contours (i.e. the shapes of the used watermark unit images) of the watermark unit images to the watermark image. The watermark image is filled with the shapes of the watermark unit images, and then the watermark unit images are filled with the imaging colors obtained accordingly to generate the watermark.

Example 4

A system for generating a watermark on the basis of graphic, provided in this example, comprises an input unit for receiving a first input instruction from a user to acquire a watermark image and at least one watermark unit image, and also receiving a second input instruction from the user to acquire watermark encryption information; an encryption unit for determining the distribution information of the watermark unit images in the watermark image according to the watermark encryption information and a preset encryption model, the distribution information comprising imaging regions of the watermark unit images in the watermark image; and a generation unit for overlaying each watermark unit image into a corresponding imaging region in the watermark image according to the imaging region of each watermark unit image to generate the watermark.

Further, the watermark unit image comprises one or more of logo, vector diagram, graphics, text, and numbers input by a user; and the watermark image comprises graphics, text or numbers.

Further, the watermark encryption information comprises one or more of user IP address, equipment name and user account.

Further, the distribution information further comprises imaging colors of the watermark unit images.

The generation unit is also used for separately determining the colors of the corresponding watermark unit images in the watermark image according to the imaging color of each watermark unit image to generate the watermark.

Further, the step of overlaying each watermark unit image into a corresponding imaging region in the watermark image according to the imaging region of each watermark unit image specifically includes identifying the contour of each watermark unit image; and overlaying the contour of the watermark unit image into the corresponding imaging region in the watermark image.

The system provided in this example has the same implementation principle and technical effects as the foregoing method examples. For brief description, part not mentioned in this system example can find corresponding description in the foregoing method examples.

Example 5

Figure 3:
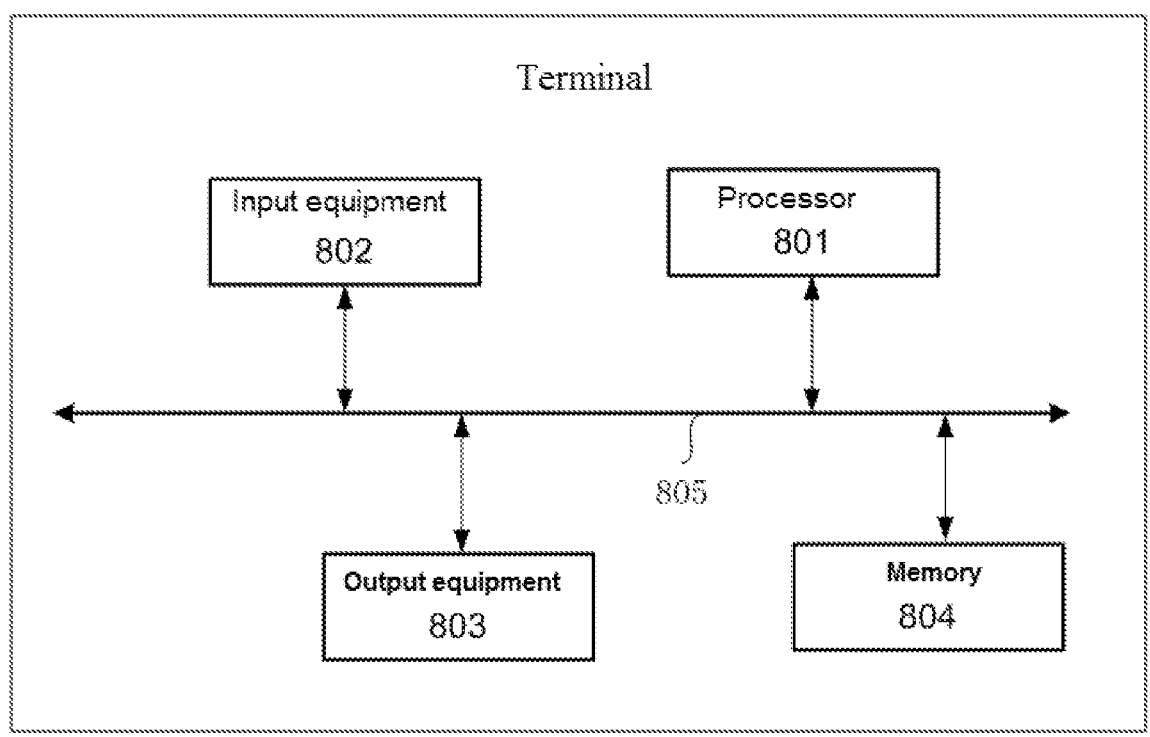
FIG. 3 is a block diagram of the terminal provided in the fifth example.

With reference to FIG. 3, a terminal is provided in this example and comprises a processor 801, input equipment 802, output equipment 803 and a memory 804 all connected with each other via a bus 805. The memory is used for storing computer programs, the computer programs comprise program instructions, and the processor is configured for calling the program instructions to execute the methods of Examples 1-3.

It should be understood that, in the examples of the invention, the processor 801 may be a central processing unit (CPU), or other general processors, digital signal processors (DSP), application specific integrated circuits (ASIC), field-programmable gate arrays (FPGA), other programmable logic devices, discrete gates, transistor logic devices, discrete hardware components, etc. The general processors may be microprocessors or any other conventional processors.

The input equipment 802 may comprise a touch panel, a fingerprint sensor (for acquiring user fingerprint information and fingerprint direction information), a microphone, etc. The output equipment 803 may comprise a display (LCD etc.), a loudspeaker, etc.

The memory 804 may comprise a read-only memory and a random access memory, and provides instructions and data to the processor 801. Part of the memory 804 may further comprise a nonvolatile random access memory. For example, the memory 804 can also store information on equipment type.

In specific implementation, the processor 801, the input equipment 802 and the output equipment 803 described in this example may execute the implementations described in the first and second examples of the methods provided in the present invention, and also the implementation of the terminal described in the example of the present invention. As a result, no more details are provided herein.

Example 6

A computer readable storage medium is provided in this example, and stores computer programs comprising program instructions. When the program instructions are run on the processor, the processor is enabled to execute the methods of Examples 1-3.

The computer readable storage medium may be an internal storage unit of the terminal mentioned in any foregoing example, such as hard disk or memory of the terminal. The computer readable storage medium may also be external storage equipment of the terminal, such as plug-in hard disk, smart media card (SMC), secure digital (SD) card and flash card equipped on the terminal. Further, the computer readable storage medium may also comprise both the internal storage unit and the external storage equipment. It is used for storing the computer programs and other programs and data required by the terminal. The computer readable storage medium may also be used for temporarily storing output data or to-be-output data.

Those of ordinary skill in the art may realize that the units and the algorithm steps of each example described in the embodiments disclosed herein can be implemented by electronic hardware, computer software or a combination of both. In order to clearly illustrate the interchangeability between hardware and software, a general description of the composition and steps of each example is given according to functions in the above illustration. Whether the functions are performed by hardware or software depends on the specific application and design constraint conditions of the technical solution. Professional technicians can use different methods to realize the described functions in each specific application, which should not be considered as going beyond the scope of the present invention.

In the embodiments provided in this application, it should be understood that the disclosed medium, terminal and method can be implemented by other ways. For example, the device examples described above are only illustrative. For example, the division of the units is only a logical function division, and there may be other divisions in actual implementation. For instance, multiple units or components can be combined or integrated to another system, or some features can be ignored or not implemented. In addition, the shown or discussed mutual coupling or direct coupling or communicating connection may be indirect coupling or communicating connection via some interfaces, devices or units, and may also be electrical, mechanical or other connections.

The units illustrated as separate parts can be physically separate or not. The parts shown as units can be physical units or not, that is, they can be located in one place or distributed on many network units. The purpose of the embodiments of the present invention can be achieved by selecting part or all of the units as required.

Furthermore, each functional unit in each embodiment of the present invention can be integrated in one processing unit, or physically exists as an individual, or two or more units are integrated in one unit. The integrated unit can be implemented in the form of hardware or a software functional unit.

The integrated unit can be stored in a computer readable storage medium when implemented in the form of the software functional unit and on sale or for use as an independent product. Based on such understanding, the technical solution of the present invention can be embodied in the form of a software product essentially or in terms of the part contributing to prior arts, or all or part of the technical solution. The computer software product is stored in one storage medium and includes a number of instructions for enabling one piece of computer equipment (such as personal computer, server and network equipment) to perform all or part of the steps of the method of each embodiment of the present invention. The storage medium includes various media capable of storing program codes, such as USB disk, portable hard drive, read-only memory (ROM), random access memory (RAM), magnetic disk and optical disk.

Finally, it should be noted that the abovementioned embodiments are only used to illustrate the technical solutions of the present invention, and not to limit them. Although the present invention has been described in detail with reference to the foregoing embodiments, those of ordinary skill in the art should understand that modifications can be made on the technical solutions recorded in the foregoing embodiments, or equivalent replacements can be made on part or all of the technical features. These modifications or replacements do not make the essence of the corresponding technical solutions deviate from the scope of the technical solutions of the embodiments of the present invention, and should be covered within the scope of the specification of the present invention.

What is claimed is:

1. A method for generating a watermark based on graphics, comprising the steps of:
    receiving a first input instruction from a user to acquire a watermark image and at least one watermark unit image;
    receiving a second input instruction from the user to acquire watermark encryption information;
    determining the distribution information of the watermark unit images in the watermark image according to the watermark encryption information and a preset encryption model; and
    overlaying each watermark unit image into a corresponding imaging region in the watermark image according to the imaging region of each watermark unit image to generate the watermark, wherein:
    the distribution information comprising imaging regions of the watermark unit images in the watermark image;

the watermark unit image includes one or more of logo, vector diagram, graphics, texts and numbers input by a user; and the watermark image includes one of graphics, texts and numbers.

2. The method in claim 1, wherein the watermark encryption information includes one or more of user IP address, equipment name and user account.

3. The method in claim 1, further comprising the steps of, after overlaying each watermark unit image into the corresponding imaging region in the watermark image, separately determining the colors of the corresponding watermark unit images in the watermark image according to the imaging color of each watermark unit image to generate the watermark, wherein:

the distribution information further includes imaging colors of the watermark unit images.

4. The method in claim 1, wherein the step of overlaying each watermark unit image into a corresponding imaging region in the watermark image according to the imaging region of each watermark unit image includes:

identifying the contour of each watermark unit image; and overlaying the contour of the watermark unit image into the corresponding imaging region in the watermark image.

5. A terminal, comprising a processor, input equipment, output equipment and a memory all connected with each other, wherein:

the memory is used for storing computer programs;

the computer programs have program instructions; and the processor is configured for calling the program instructions to execute the method in claim 1.

6. A system for generating a watermark based on graphics, comprising:

an input unit for receiving a first input instruction from a user to acquire a watermark image and at least one watermark unit image, and also receiving a second input instruction from the user to acquire watermark encryption information;

an encryption unit for determining the distribution information of the watermark unit images in the watermark image according to the watermark encryption information and a preset encryption model; and a generation unit for overlaying each watermark unit image into a corresponding imaging region in the watermark image according to the imaging region of each watermark unit image to generate the watermark, wherein:

the distribution information includes imaging regions of the watermark unit images in the watermark image;

the watermark unit image includes one or more of logo, vector diagram, graphics, texts and numbers input by a user; and the watermark image includes one of graphics, texts and numbers.

7. The system in claim 6, wherein:

the distribution information further comprises includes colors of the watermark unit images; and the generation unit is also used for separately determining the colors of the corresponding watermark unit images in the watermark image according to the imaging color of each watermark unit image to generate the watermark.

8. The terminal in claim 6, wherein, in the method in claim 1, the watermark encryption information includes one or more of user IP address, equipment name and user account.

9. The terminal in claim 5, wherein:

the method in claim 1 further comprises the steps of, after overlaying each watermark unit image into the corresponding imaging region in the watermark image, separately determining the colors of the corresponding watermark unit images in the watermark image according to the imaging color of each watermark unit image to generate the watermark; and the distribution information further includes imaging colors of the watermark unit images.

10. The terminal in claim 5, wherein, in the method in claim 1, the step of overlaying each watermark unit image into a corresponding imaging region in the watermark image according to the imaging region of each watermark unit image includes:

identifying the contour of each watermark unit image; and overlaying the contour of the watermark unit image into the corresponding imaging region in the watermark image.

* * * * *